United States Patent
Berke et al.

(10) Patent No.: US 9,313,056 B1
(45) Date of Patent: Apr. 12, 2016

(54) SYSTEM AWARE TRANSMITTER ADAPTATION FOR HIGH SPEED SERIAL INTERFACES

(71) Applicant: Dell Products, LP, Round Rock, TX (US)

(72) Inventors: Stuart Allen Berke, Austin, TX (US); Bhyrav M. Mutnury, Round Rock, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 0 days.

(21) Appl. No.: 14/535,796

(22) Filed: Nov. 7, 2014

(51) Int. Cl.
*H04L 25/03* (2006.01)
*H04B 3/04* (2006.01)

(52) U.S. Cl.
CPC ............ *H04L 25/03878* (2013.01); *H04B 3/04* (2013.01)

(58) Field of Classification Search
CPC .... H04B 25/03878; H04B 3/04; H04B 17/00; H04B 10/07; H04L 25/03878
See application file for complete search history.

(56) References Cited

U.S. PATENT DOCUMENTS

| | | | | |
|---|---|---|---|---|
| 7,450,636 | B2 * | 11/2008 | Lee et al. | 375/232 |
| 8,031,763 | B2 * | 10/2011 | Sumesaglam | 375/232 |
| 8,588,288 | B2 * | 11/2013 | Witt | 375/232 |
| 8,654,898 | B2 | 2/2014 | Bereza et al. | |
| 2008/0304557 | A1 * | 12/2008 | Hollis | 375/231 |
| 2010/0246657 | A1 | 9/2010 | Ou | |
| 2013/0051153 | A1 | 2/2013 | Tailliet et al. | |
| 2013/0169314 | A1 * | 7/2013 | Choudhary et al. | 327/91 |
| 2013/0301695 | A1 | 11/2013 | Nishi | |
| 2014/0269881 | A1 * | 9/2014 | HE et al. | 375/231 |

* cited by examiner

*Primary Examiner* — Jean B Corrielus
(74) *Attorney, Agent, or Firm* — Larson Newman, LLP

(57) ABSTRACT

A high-speed serial interface includes a transmitter having an output module with settings that select an output impedances of the output module and a tuning value for the output impedance, and a receiver having a plurality of compensation modules each to provide a selectable level of equalization to a data bitstream from the transmitter, and a control module that directs the transmitter to successively select each of the tuning values, that directs the compensation modules, for each tuning value, to successively select each of the levels of equalization, that evaluates an indication of a performance level of the receiver for each of the successively selected levels of equalization and for each of the tuning values, and that selects a particular tuning value based upon the indications of the performance level of the receiver.

20 Claims, 5 Drawing Sheets

SYSTEM AWARE TRANSMITTER ADAPTATION FOR HIGH SPEED SERIAL INTERFACES

FIELD OF THE DISCLOSURE

This disclosure generally relates to information handling systems, and more particularly relates to system aware transmitter adaptation in a high speed serial interface.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

As the speed of serial interfaces increases, variations in circuit design, component manufacture, environmental conditions, and other factors make it increasingly difficult to ensure highly reliable data transmission. In particular, transmitter and receiver equalization mechanisms to compensate for channel loss are calibrated on a best-effort basis, where settings that result in a "good enough" compensation solution are quickly obtained, in favor of iterative processes that might yield a more optimal solution, but which require an inordinate amount of time for such link training.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements.

Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
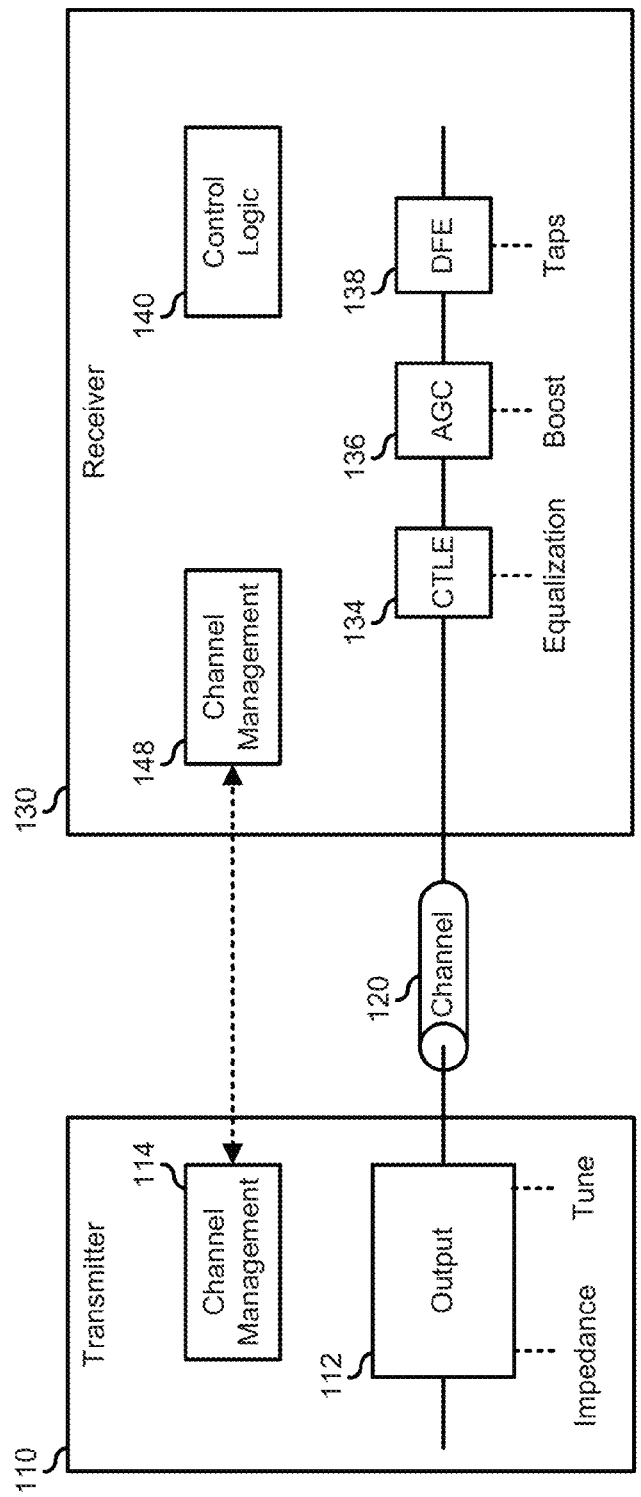
FIG. 1 illustrates a high speed serial interface according to an embodiment of the present disclosure.
Figure 2:
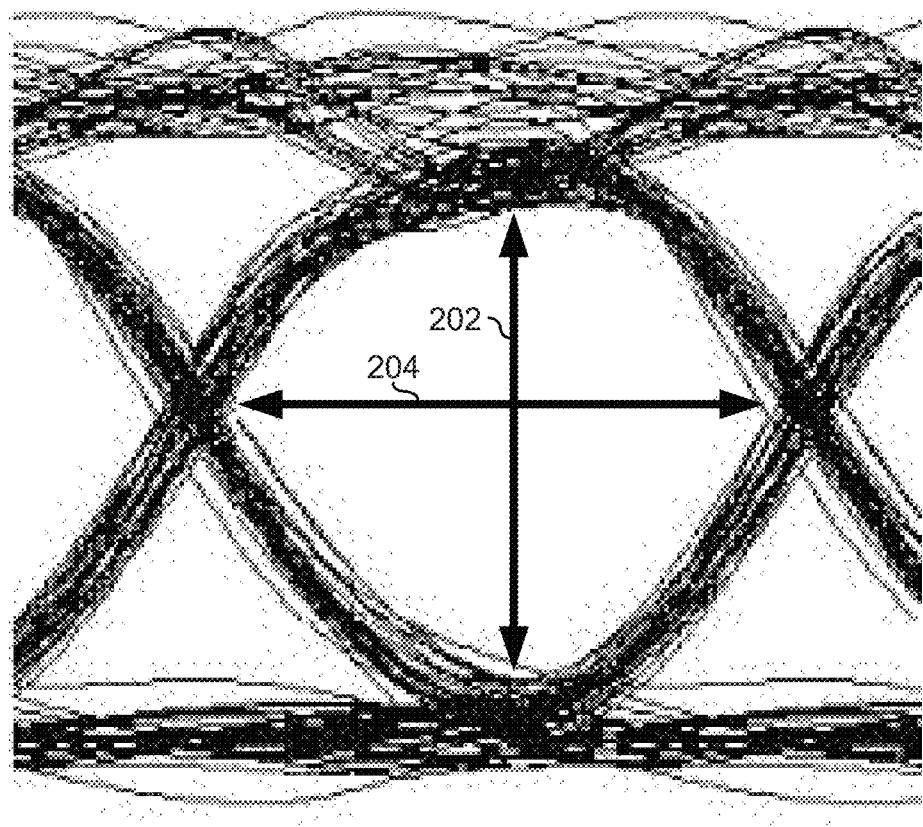
FIG. 2 illustrates a receiver eye diagram for the serial interface of FIG. 1.

FIG. 1 illustrates an embodiment of a high speed serial channel 100 of an information handling system. For the purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Serial channel 100 includes a transmitter 110, a transmission channel 120, and a receiver 130. Serial channel 100 represents one half of a bi-directional serial data link for communicating data from transmitter 110 located at a first component to receiver 130 located at a second component. The other half of the bi-directional serial data link is similar to serial channel 100, but with a receiver in the first component, and a transmitter in the second component, for communicating data back from the second component to the first component. Here, the components can be understood to include elements within an information handling system, such as elements that are attached to one or more printed circuit board of the information handling system, where transmission channel 120 can represent one or more circuit traces on the printed circuit board, and can include one or more connectors. The components can also be understood to include devices of an information handling system, such as a hard drive, a storage array, and the like, that are separate from the printed circuit board of the information handling system, where transmission channel 120 can include one or more transmission cables. An example of serial channel 100 includes a PCI-Express (PCIe) channel that is in compliance with one or more PCIe specification, up to, and including the PCIe 4.0 Specification, a Serial ATA (SATA) channel that is in compliance with one or more SATA specification, up to, and including the SATA 3.2 Specification, a SAS channel that is in compliance with one or more SAS specification, up to and including the Serial Attached SCSI 4.0 Standard, or another high speed serial channel.

Serial channel 100 operates to provide back channel adaptation where transmitter 110 and receiver 130 communicate with each other to optimize and adjust various compensation values within the transmitter and the receiver to compensate for the insertion loss of transmission channel 120. A determination is made as to whether or not a set of compensation values is satisfactory. In a particular embodiment, the determination is based upon the bit error rate (BER) associated with the set of values. In another embodiment, the determination is based upon the characteristics of the receiver eye pattern for the transmitted signals. It is possible for multiple different sets of compensation values to result in acceptable BER or receiver eye characteristics in serial channel 100. Moreover, even on a particular information handling system, operating at different times, the back channel adaptation mechanism may operate to provide different sets of compensation values based upon minute variations in the operating condition of the information handling system. As such, serial channel 100 operates to adjust an output impedance of transmitter 110 and to repeatedly perform the back channel adaptation, recording the set of compensation values for each iteration of the back channel adaptation at each impedance setting, in order to determine a best impedance setting, as described below. Then serial channel 100 further operates to use the best impedance setting for subsequent iterations of the back channel adaptation.

Transmitter 110 includes a channel output module 112 and a channel management module 114. Channel output module 112 includes an impedance setting and a tuning setting. The impedance setting operates to select a target impedance for the output of receiver 130. For example, the impedance setting can operate to select a 25 ohm output impedance, a 40 ohm output impedance, a 50 ohm output impedance, a 75 ohm output impedance, or another output impedance selected to match an impedance of transmission channel 120, as needed or desired. The tuning setting operates to select a fine tuning of the output impedance of transmitter 110 around the nominal impedance selected by the impedance setting. In a particular embodiment, the tuning setting provides a low impedance adjustment setting, a nominal setting, and a high impedance adjustment setting. For example, the low impedance adjustment setting can decrease the output impedance of channel output module 112 by a particular impedance value or percentage, and the high impedance adjustment setting can increase the output impedance of channel output module 112 by a particular impedance value or percentage. In another embodiment, the tuning setting provides more or less than three impedance adjustment settings, as needed or desired. Channel management module 114 will be described below.

Receiver 130 includes a continuous time linear equalization (CTLE) module 134, an automatic gain control (AGC) module 136, a decision feedback equalization (DFE) module 138, a control logic module 140, and a channel management module 148. In operation, serial data is received from transmitter 110, the received signal is provided to CTLE module 134, and the CTLE module operates to provide compensation for inter-signal interference (ISI) in order to open the signal eye of the received signal. The amount of compensation is determined based upon an equalization setting. For example, receiver 130 can support 21 equalization settings which each prescribe a different amount of equalization, from 0 dB to 10 dB, in 0.5 dB steps. Other numbers of settings and amounts of equalization prescribed by the equalization setting can be utilized, as needed or desired The equalized signal is provided from CTLE module 134 to AGC module 136. AGC module 136 operates to provide linear gain to the signal received from CTLE module 134 to further open the signal eye of the received signal. The amount of gain is determined by a gain setting, and can support 21 gain settings which each prescribe a different amount of gain, for example, from 0 dB to 10 dB, in 0.5 dB steps. Other numbers of settings and amounts of gain prescribed by the gain setting can be utilized, as needed or desired.

The amplified signal is provided from AGC module 136 to DFE module 138. DFE module 138 operates to provide feedback based compensation to the received signal. The amount of compensation is determined by enabling a number of circuit feedback taps. For example, DFE module 138 can support up to 16 taps that provide compensation based upon up to 16 previous data points. In a particular embodiment, DFE module 138 can be turned off, thereby reducing the power consumed by receiver 130. In another embodiment, one or more tap of DFE module 138 can be turned on based upon the taps setting, while the rest of the taps are placed into a tri-state condition, that is, with power applied, but with the taps not providing feedback to the resultant DFE compensation. In yet another embodiment, one or more tap of DFE module 138 can be turned on based upon the taps setting, while the rest of the taps are turned off, thereby reducing the power consumed by receiver 130. Other numbers of taps can be utilized, as needed or desired.

In operation, the impedance setting of channel output module 112 is set based upon a design target for transmission channel 120. For example, if transmission channel 120 is designed as a 25 ohm transmission channel, then the impedance setting is set to the 25 ohm setting, and so forth. Control logic module 140 operates to direct transmitter 110 to set the tuning setting to the minimum offset setting, such as a minus one ohm setting. Control logic module 140 communicates with transmitter 110 via a communication channel established between channel management module 114 and channel management module 148. In a particular embodiment, management module 114 and channel management module 148 represent a separate side-band communication channel for communicating adaptation instructions between transmitter 110 and receiver 130. In another embodiment, management module 114 and channel management module 148 represent management traffic between transmitter 110 and receiver 130 that is communicated over transmission channel 120 and an additional transmission channel from receiver 130 to transmitter 110.

With the tuning setting of channel output module 112 set to the minimum offset setting, control logic module 140 runs through the various combinations of settings for the equalization setting, the gain setting, and the taps setting, recording for each combination, an associated eye height or an associated BER, as needed or desired. Control logic module 140 directs transmitter 110 to select a next tuning setting of channel output module 112 and repeats the process of recording the associated eye height or BER for each of the various combinations of settings. Control logic module 140 continues the process of recording the associated eye height or BER for all tuning setting of channel output module 112. Based upon the recorded eye heights or BERs, control logic module 140 determines a best tuning setting, and directs transmitter 110 to set the tuning setting to the best setting. Then, in subsequent iterations of back channel adaptations, transmitter 110 is set to provide the optimal performance for transmission channel 120. A method for determining the best tuning setting is described below.

Figure 3:
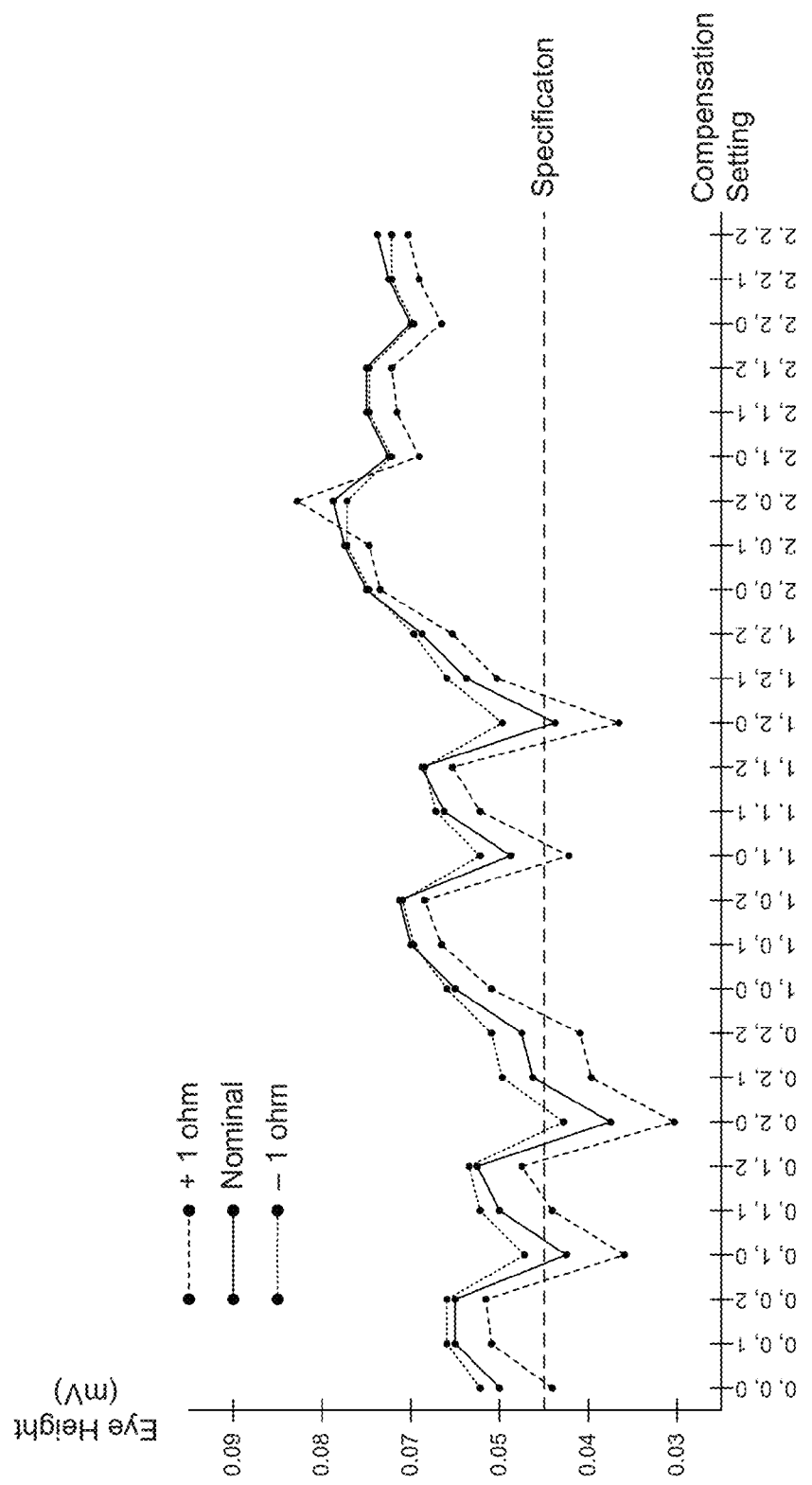
FIG. 3 is a graph illustrating a determination of a best impedance tuning setting in the serial interface of FIG. 1.

FIG. 3 illustrates a graph of the exemplary results of various eye height measurements. Here, it is assumed for the sake of simplicity that CTLE module 134 has three equalization settings (0, 1, and 2), that AGC module 136 has three gain settings (0, 1, and 2), that DFE module 138 has three tap settings (0, 1, and 2), and that channel output module 112 has three settings (−1 ohm, nominal, and +1 ohm). Here, the equalization settings for receiver 130 are shown in the various combinations along the x-axis of the graph, where (x, y, z) represents a particular combination of settings. For example, the x-value can represent the equalization setting value, the y-value can represent the gain setting value, and the z-value can represent the taps setting value. The eye heights are marked for each tuning setting for channel output module 112. Thus, a first line illustrates the eye heights for each combination of settings for the +1 ohm tuning setting, a second line illustrates the eye heights for each combination of settings for the nominal tuning setting, and a third line illustrates the eye heights for each combination of settings for the −1 ohm tuning setting.

The y-axis of the graph shows the recorded eye height in mili-volts (mV). The graph also illustrates a threshold value that represents a specified minimum eye height at 0.045 mV. In a particular embodiment, the best tuning setting is determined by the line that includes the highest eye height. Here, because the receiver setting of (2, 0, 2) produces a maximum eye height of around 0.0825 mV with the +1 ohm tuning setting, then the +1 ohm tuning setting is determined to be the best setting. In another embodiment, the setting that results in the lowest number of failing eye heights is determined to be the best tuning setting. Here, because the −1 ohm tuning setting only results in three failing setting combinations, the −1 ohm tuning setting is determined to be the best setting. In another embodiment, the best tuning setting is determined as the setting that produces the highest average eye height. In another embodiment, the best tuning setting is determined as the setting that results in a lowest standard deviation of the eye heights. In yet another embodiment, a combination of the above described criteria for determining the best tuning setting is employed, or another criteria is utilized, as needed or desired.

Figure 4:
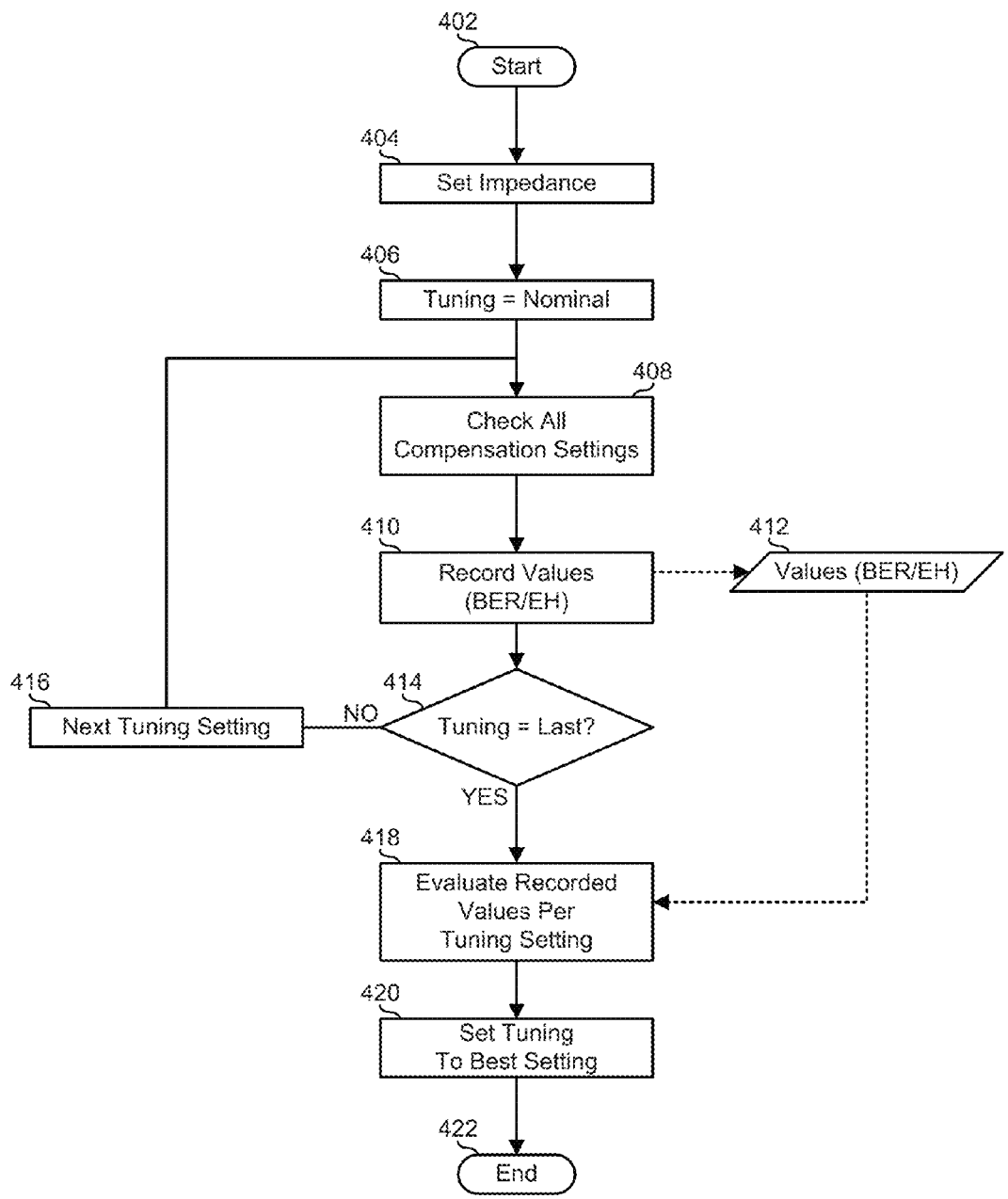
FIG. 4 is a flowchart illustrating a method of determining an impedance tuning setting in a serial interface according to an embodiment of the present disclosure.

FIG. 4 illustrates a method of determining an impedance tuning setting in a serial interface, starting at block 402. An impedance for a transmitter is set in block 404. For example, the impedance setting of channel output module 112 can be selected to match the design impedance of transmission channel 120. A tuning setting for the transmitter is set to nominal in block 406. For example, the tuning setting of channel output module 112 can be set to the nominal setting. The various combinations of compensation settings are selected in block 408, and a measurement of the value at each combination is recorded in block 410. For example, the 27 combinations of compensation settings as described in FIG. 3, above, can be selected, and a BER or an eye height can be measured and recorded. The skilled artisan will recognize that a method for selecting the combinations of compensation settings can include a nested loop where each combination of compensation settings is selected. The recorded values from block 410 are stored in a values database 412.

A decision is made as to whether or not the selected tuning setting is the last tuning setting in decision block 414. If not, the "NO" branch of decision block 414 is taken, the next tuning setting is selected in block 416, and the method returns to block 408 where the various compensation setting combinations are selected. If the selected tuning setting is the last tuning setting, the "YES" branch of decision block 414 is taken and the recorded values for each tuning setting are evaluated to determine the best tuning setting in block 418. For example, the best tuning setting can include one or more of the tuning setting that included the combination of compensation settings that provided the maximum eye height or the minimum BER, the tuning setting that included the fewest number of combinations of compensation settings that failed a particular criteria, the tuning setting that included the highest average eye height or the lowest average BER, or another criteria, as needed or desired. The recorded values are derived from values database 412. The transmitter is set to the best tuning setting in block 420 and the method ends in block 422.

Figure 5:
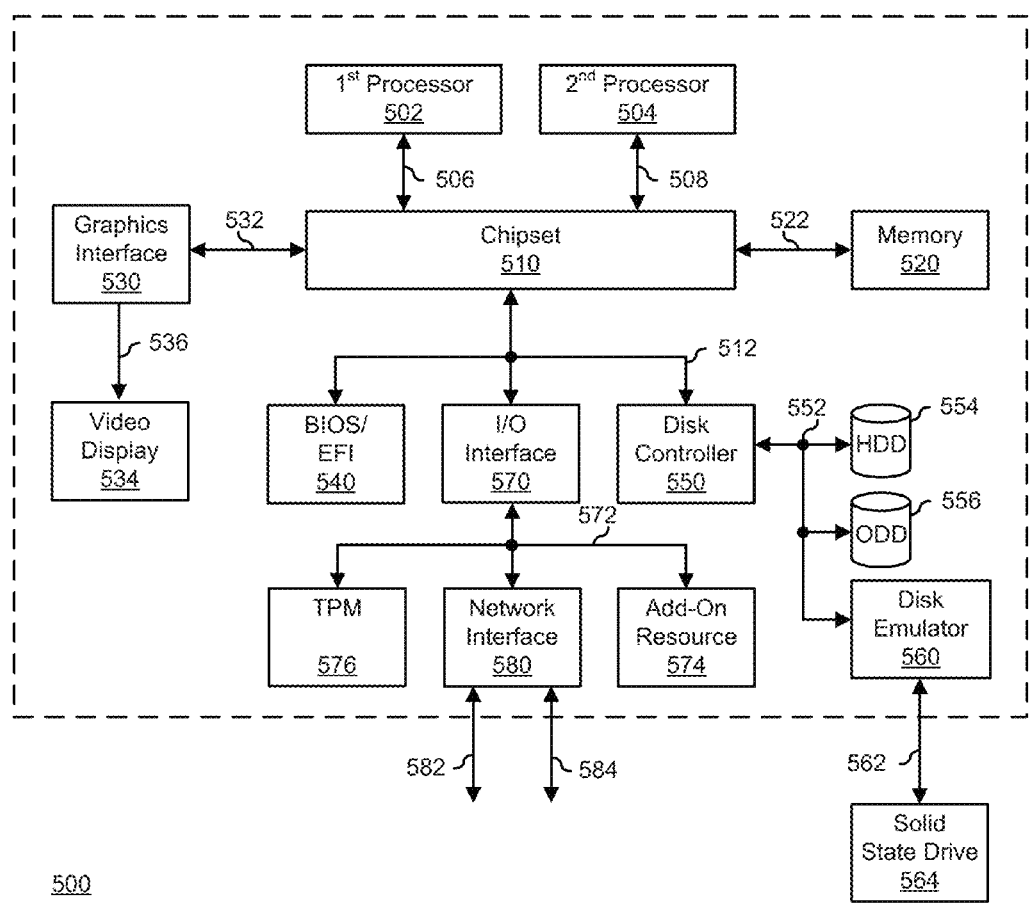
FIG. 5 is a block diagram illustrating a generalized information handling system according to an embodiment of the present disclosure.

FIG. 5 illustrates a generalized embodiment of information handling system 500. For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described above, and operates to perform one or more of the methods described above. Information handling system 500 includes a processors 502 and 504, a chipset 510, a memory 520, a graphics interface 530, include a basic input and output system/extensible firmware interface (BIOS/EFI) module 540, a disk controller 550, a disk emulator 560, an input/output (I/O) interface 570, and a network interface 580. Processor 502 is connected to chipset 510 via processor interface 506, and processor 504 is connected to the chipset via processor interface 508. Memory 520 is connected to chipset 510 via a memory bus 522. Graphics interface 530 is connected to chipset 510 via a graphics interface 532, and provides a video display output 536 to a video display 534. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, initialize the resources, and access the resources. BIOS/EFI module 540 includes code that operates to detect resources within information handling system 500, to provide drivers for the resources, to initialize the resources, and to access the resources.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits a solid-state drive 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574, to a TPM 576, and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as chipset 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated).

The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A high-speed serial interface, comprising:
a transmitter having an output module with a first setting that selects an output impedance from among a plurality of output impedances of the output module, and a second setting that selects a tuning value from among a plurality of tuning values for the output impedance; and
a receiver having:
a plurality of compensation modules each to provide a selectable level of equalization to a data bitstream from the transmitter; and
a control module that directs the transmitter to successively select each of the tuning values, that directs the compensation modules, for each tuning value, to successively select each of the levels of equalization, that evaluates an indication of a performance level of the receiver for each of the successively selected levels of equalization and for each of the tuning values, and that selects a particular tuning value based upon the indications of the performance level of the receiver.

2. The high-speed serial interface of claim 1, wherein the receiver includes an analog-to-digital converter module that provides a receiver eye height level for the data bitstream, and wherein the performance level comprises receiver eye height.

3. The high-speed serial interface of claim 2, wherein the particular tuning value is selected when a set of indications of the performance level associated with the particular tuning value includes a set of equalization levels that produced the highest receiver eye height.

4. The high-speed serial interface of claim 2, wherein the particular tuning value is selected when a set of indications of the performance level associated with the particular tuning value had a highest average receiver eye height.

5. The high-speed serial interface of claim 2, wherein the particular tuning value is selected when a set of indications of the performance level associated with the particular tuning value had a lowest number of failing receiver eye heights.

6. The high-speed serial interface of claim 1, wherein the performance level comprises bit error rate.

7. The high-speed serial interface of claim 2, wherein the particular tuning value is selected when a set of indications of the performance level associated with the particular tuning value includes a set of equalization levels that produced the lowest bit error rate.

8. The high-speed serial interface of claim 2, wherein the particular tuning value is selected when a set of indications of the performance level associated with the particular tuning value had a lowest average bit error rate.

9. The high-speed serial interface of claim 2, wherein the particular tuning value is selected when a set of indications of the performance level associated with the particular tuning value had a lowest number of failing bit error rates.

10. A method, comprising:
  selecting, at a transmitter of a high-speed serial interface, an output impedance from among a plurality of output impedances;
  successively selecting, by a control module of a receiver coupled to the transmitter, each of a plurality of tuning values for the output impedance;
  successively selecting for each of the tuning values, by the control module, each of a plurality of selectable levels of equalization to a data bitstream for a plurality of compensation modules, wherein the data bitstream is received at the receiver from the transmitter,
  evaluating, by the control module, an indication of a performance level of the receiver for each of the successively selected levels of equalization and for each of the tuning values; and
  selecting, by the control module, a particular tuning value based upon the indications of the performance level of the receiver.

11. The method of claim 10, wherein the receiver includes an analog-to-digital converter module that provides a receiver eye height level for the data bitstream, and wherein the performance level comprises receiver eye height.

12. The method of claim 11, wherein the particular tuning value is selected when a set of indications of the performance level associated with the particular tuning value includes a set of equalization levels that produced the highest receiver eye height.

13. The method of claim 11, wherein the particular tuning value is selected when a set of indications of the performance level associated with the particular tuning value had a highest average receiver eye height.

14. The method of claim 11, wherein the particular tuning value is selected when a set of indications of the performance level associated with the particular tuning value had a lowest number of failing receiver eye heights.

15. The method of claim 10, wherein the performance level comprises bit error rate.

16. The method of claim 15, wherein the particular tuning value is selected when a set of indications of the performance level associated with the particular tuning value includes a set of equalization levels that produced the lowest bit error rate.

17. The method of claim 15, wherein the particular tuning value is selected when a set of indications of the performance level associated with the particular tuning value had a lowest average bit error rate.

18. The method of claim 15, wherein the particular tuning value is selected when a set of indications of the performance level associated with the particular tuning value had a lowest number of failing bit error rates.

19. A non-transitory computer-readable medium including code that, when executed by a processor, allows the processor to perform a method, the method comprising:
  selecting, at a transmitter of a high-speed serial interface, an output impedance from among a plurality of output impedances of the transmitter;
  successively selecting, by a control module of a receiver coupled to the transmitter, each of a plurality of tuning values for the output impedance;
  successively selecting for each of the tuning values, by the control module, each of a plurality of selectable levels of equalization to a data bitstream for a plurality of compensation modules, wherein the data bitstream is received at the receiver from the transmitter,
  evaluating, by the control module, an indication of a performance level of the receiver for each of the successively selected levels of equalization and for each of the tuning values; and
  selecting, by the control module, a particular tuning value based upon the indications of the performance level of the receiver.

20. The computer-readable medium of claim 19, wherein the performance level comprises at least one of a receiver eye height and a bit error rate.

* * * * *